Figure 1:
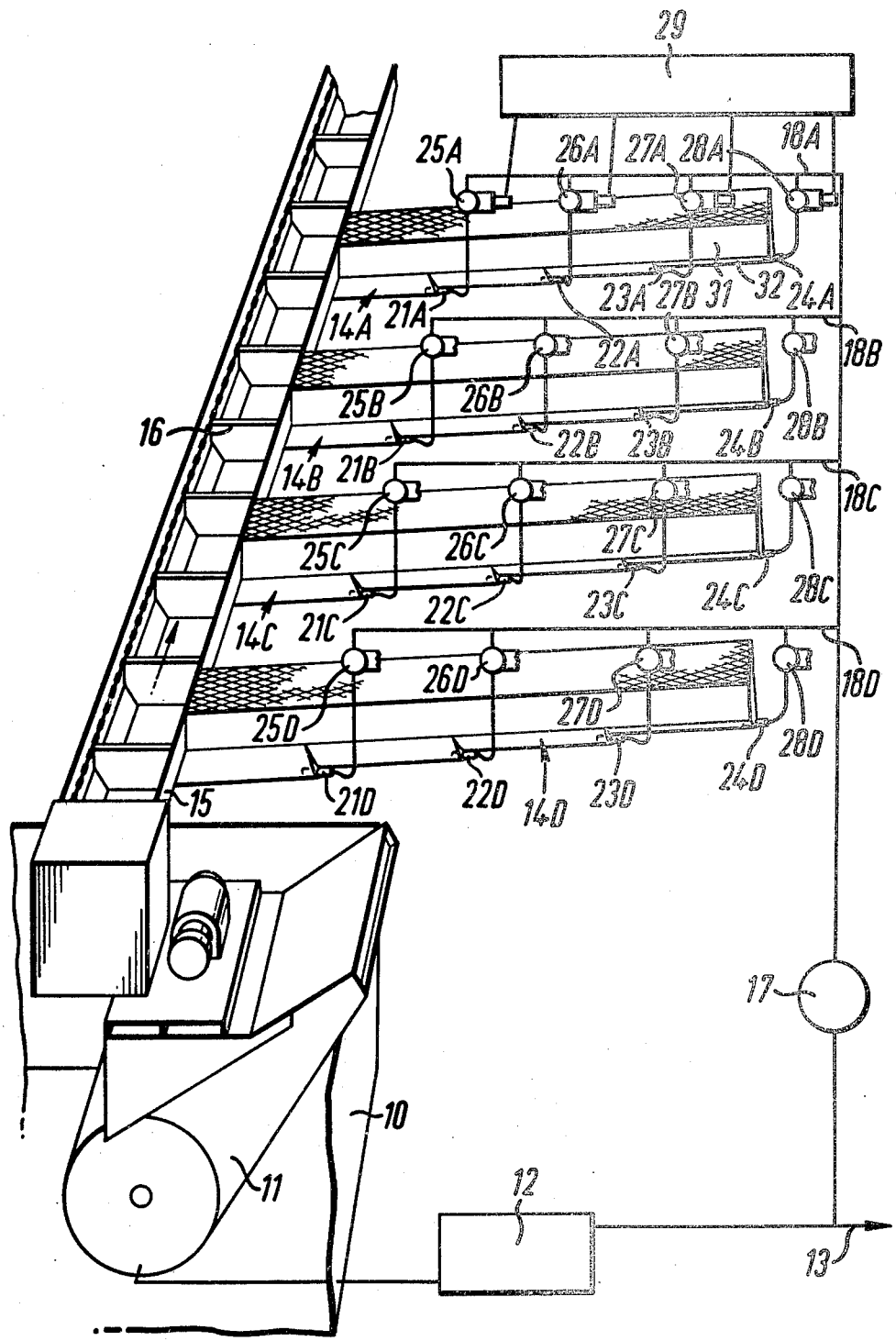

United States Patent [19]

Alexander

[11] 4,264,240
[45] Apr. 28, 1981

[54] SWARF CONVEYANCE SYSTEM FOR A MACHINE TOOL INSTALLATION

[75] Inventor: Robert O. Alexander, Mitcham, England

[73] Assignee: Cera International Limited, London, England

[21] Appl. No.: 962,789

[22] Filed: Nov. 20, 1978

[30] Foreign Application Priority Data

Oct. 5, 1978 [GB] United Kingdom ............. 39491/78

[51] Int. Cl.³ .......................................... B65G 53/30
[52] U.S. Cl. .................................................... 406/85
[58] Field of Search ............... 406/82, 85, 106, 146; 198/493, 494, 495; 15/301; 210/167; 134/104, 109, 111

[56] References Cited

U.S. PATENT DOCUMENTS 3,248,176  4/1966  Pierson ........................ 198/495 X
3,943,596  3/1976  Wright et al. .................... 15/301

Primary Examiner—James L. Rowland
Attorney, Agent, or Firm—Cushman, Darby & Cushman

[57] ABSTRACT

Each line of a multi-line machine tool installation is provided with a sluiceway for receiving coolant/lubricant liquid drained from the machine tools of the line as well as for receiving swarf from those machine tools. Flushing jets are mounted at intervals along the line for flushing swarf along the sluiceway. Liquid supply to each flushing jet is controlled by a respective shut-off valve which is normally closed. A pump drains liquid from a stream of such liquid that is being fed under pressure to the machine tools for use as coolant/lubricant during machining, and feeds that liquid to the shut-off valves under an increased pressure. The shut-off valves are opened automatically one at a time in a predetermined sequence.

7 Claims, 2 Drawing Figures

SWARF CONVEYANCE SYSTEM FOR A MACHINE TOOL INSTALLATION

This invention relates to machine tool installations and particularly to systems for conveying swarf away from the machine tools of such installations.

One known system for conveying swarf away from machine stations of a line of machine tools comprises a plurality of continuously running flushing jets located at spaced intervals along a sluiceway for flushing swarf along that sluiceway to a drag conveyor. A substantial quantity of liquid is needed to maintain such a number of flushing jets with the consequential need for liquid pumping means having a considerable capacity.

An object of this invention is to provide an effective system for conveying swarf away from machine stations in a machine tool system which does not require such a substantial amount of energy for its operation.

According to one aspect of this invention in a machine tool installation comprising lines of machine tools and a centralized swarf removal and coolant filtration and recirculation system, said system comprising a liquid storage tank, filtering means, primary pumping means for drawing liquid from the tank through the filtering means and for pumping at one pressure a stream of liquid so filtered to machine stations of the machine tools for use as a coolant in machining operations at said stations, and means for collecting liquid drained from said stations and for returning such collected liquid to the tank; a swarf conveyance system comprising means forming a pathway along which swarf formed by machine tools of the system is to be conveyed and means for impelling swarf along said pathway; said swarf impelling means comprising a series of jets which are located at spaced intervals along the pathway and which are orientated so that they are adapted to direct jets of liquid under pressure at swarf on said pathway, secondary pumping means for tapping liquid from the stream of liquid pumped to said machine stations by said primary pumping means and for pumping such tapped liquid towards each jet of the series under a pressure which is higher than said one pressure, and control means adapted to effect operation of the jets of the series one at a time in a programmed sequence so that each in turn directs at swarf on the pathway a jet of the liquid that is pumped towards it by said secondary pumping means whereby that swarf is impelled along the pathway by the impulse forces imparted to it sequentially by the series of jets of liquid under pressure that are directed at it sequentially.

Preferably said pathway is one of a plurality of such pathways each having such a series of jets which are located at spaced intervals along the pathway and which are orientated so that they are adapted to direct jets of liquid under pressure at swarf on the respective pathway, said secondary pumping means being adapted to pump such tapped liquid towards each jet of each series, and said control means being adapted to effect operation of the jets of all the series one at a time in a programmed sequence so that each in turn directs at swarf on the respective pathway a jet of the liquid that is pumped towards it by said secondary pumping means.

Conveniently conduit means are provided by which each jet of the swarf conveyance system is connected to the output of the secondary pumping means in parallel to the connection of all the other jets of that system to that output. Each parallel branch of the conduit means may include a normally-closed shut-off valve which prevents liquid flow to the respective jet when closed, the control means being adapted to cause opening of each shut-off valve in turn in order to effect operation of the respective jets in said programmed sequence. Preferably said secondary pumping means are adapted to be driven continuously during operation of the centralized swarf removal and coolant filtration and recirculation system.

Preferably said means which forms each pathway comprise a metal lined sluiceway and the lining along the base of each such sluiceway may be formed of an armoured steel.

According to another aspect of this invention there is provided a swarf conveyance system comprising means forming a pathway along which swarf is to be conveyed and means for impelling swarf along said pathway comprising a series of jets which are located at spaced intervals along the pathway, means for feeding liquid under pressure from a liquid pressure source to each jet of the series and control means adapted to effect operation of the jets of the series severally in a programmed sequence so that each in turn directs a jet of liquid under pressure at swarf on the pathway whereby that swarf is impelled along the pathway by the impulse forces imparted to it sequentially by the series of jets of liquid under pressure that are directed at it.

Preferably the liquid pressure source comprises a liquid pump which is adapted to be driven continuously during operation of the system.

Figure 2:
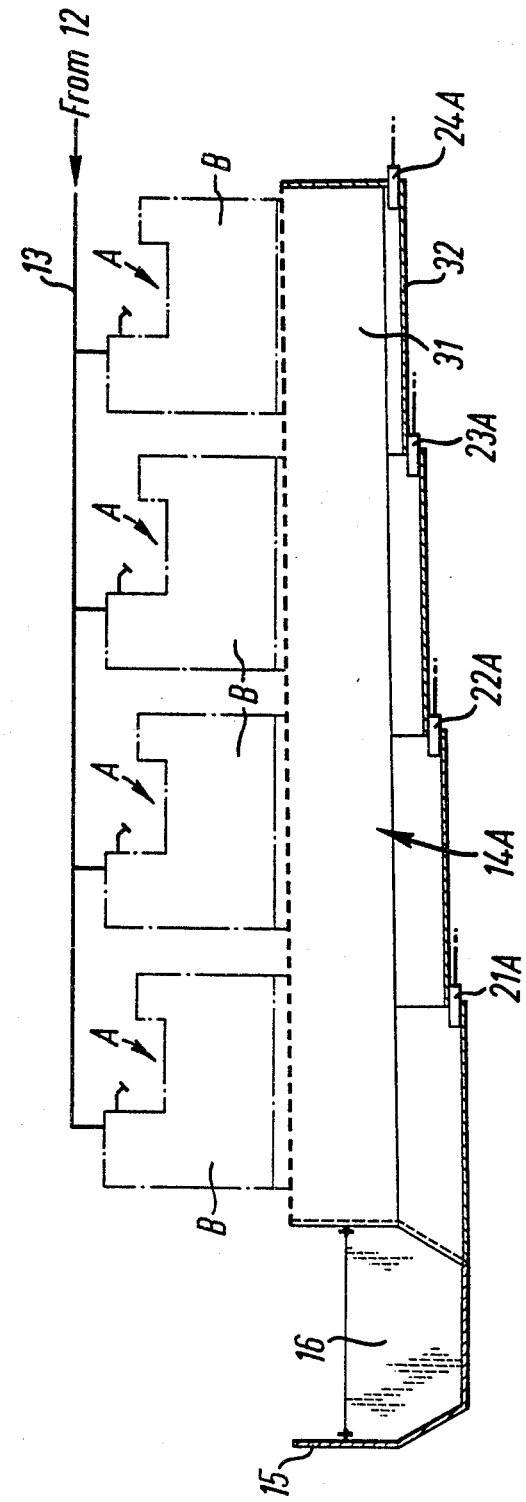

A centralized swarf removal and coolant filtration and recirculation system for four lines of machine tools and in which this invention is embodied will be described now by way of example with reference to the accompanying drawings, of which:

FIG. 1 is a diagram in perspective illustrating the principal parts of that centralized system; and FIG. 2 is a diagrammatic representation of a typical one of the lines of machine tools shown above a respective sluiceway, which is shown in section, leading into the main drag conveyor channel, which is also shown in section.

The system illustrated comprises a settling tank 10 (see FIG. 1) in which is stored liquid which is for use as a lubricant and/or a coolant in a machining operation carried out at each machine station A (see FIG. 2) of each of the four lines of machine tools B. From the viewpoint of this invention, the actual form, type and configuration of each machine tool B is immaterial. FIG. 1 shows that the tank 10 contains rotary drum filter apparatus 11. A main pump 12 outside the tank 10 has its inlet connected to the outlet of the drum filter apparatus 11 and its outlet connected to a main header pipe 13 which communicates with each machine station A of the four lines of machine tools B (as shown in FIG. 2) so that, when operating, the main pump 12 draws liquid from within the tank 10 through the drum filter apparatus 11 and pumps that liquid under pressure along the main header pipe 13 to the machine stations A of the machine tools B.

Each of the four lines of machine tools B is provided with a sluiceway 14A, 14B, 14C, 14D which is orientated with respect to the machine tools B of the respective line so as to serve as a receptacle for liquid that drains from each machine station A of the respective line of machine tools B after having been used at the respective station A as a coolant and/or a lubricant, as well as for swarf produced by the machining operations at the machine stations A of the respective line of machine tools B. FIG. 2 shows the line of machine tools B above the sluiceway 14A purely diagrammatically merely to illustrate their relative locations. The relative locations of each of the other three lines of machine tools and the respective sluiceways 14B-14D will be appreciated by the man skilled in the art from a consideration of FIGS. 1 and 2. The four sluiceways 14A-14D slope downwards to a common main drag conveyor channel 15 which in turn slopes downwards into the settling tank 10. Hence liquid that drains into each sluiceway 14A-14D flows down it into the main drag conveyor channel 15 and then flows down that channel 15 into the settling tank 10.

A drag conveyor 16, which runs from below the level of liquid in the settling tank 10 upwards through the drag conveyor channel 15 to a discharge station (not shown) picks up solids within the tank 10 as well as solids, such as swarf, that are conveyed into the drag conveyor channel 15 from the sluiceways 14A-14D, and conveys those solids upwards to the discharge station.

A secondary pump 17 has its inlet connection to the main header pipe 13. Four header pipes 18A, 18B, 18C and 18D are connected in parallel to the outlet of the secondary pump 17. Each header pipe 18A-18D runs adjacent to a respective one of the four sluiceways 14A-14D and has a plurality of branch pipes projecting from it into the respective sluiceway 14A-14D at spaced intervals along the length of that sluiceway. Each of the branch pipes carries a flushing jet at its end within the respective sluiceway and a shut-off valve which controls liquid flow from the respective header pipe 18A-18D through the branch pipe to its flushing jet. Each shut-off valve comprises a spring-closed rotary valve in combination with an automatic pneumatic actuator, the actuator including an actuating member which is linked to the rotary valve so that movement of one of them causes movement of the other and which is exposed to the interior of a working fluid chamber so that the pressure of working fluid in that chamber acts on it to urge it in the direction it must move to cause opening movement of the rotary valve against the action of the closing spring that acts on that valve, and a solenoid-operable pilot valve for controlling supply of compressed air to and venting of the working fluid chamber.

Each flushing jet is orientated with its orifice facing down the respective sluiceway 14A-14D towards the drag conveyor channel 15 so that a jet of liquid that emerges from that orifice is directed along the respective sluiceway towards the drag conveyor channel 15. The number of jets provided in each sluiceway, and hence the number of branch pipes from each header pipe 18A-18D depends upon the length of the respective sluiceway and the hydrodynamic characteristics of the jets of liquid that are formed by operation of each jet. For the sake of convenience four jets are shown in each sluiceway 14A-14D. Each of the four jets of each sluiceway is identified by the respective one of the numbers 21, 22, 23 and 24 as well as by the letter reference A, B, C or D that forms part of the reference character of the respective sluiceway 14A-14D. Similarly each shut-off valve is identified by a respective one of the numbers 25, 26, 27 and 28 as well as by the letter A, B, C or D that forms part of the reference character of the respective sluiceway 14A-14D.

The solenoid winding of each solenoid operated pilot valve is connected electrically to a respective output terminal of a single switching device 29 which conveniently is a commercially available device known as a "drum programmer". The device 29 is operable to connect each output terminal in turn and in a predetermined sequence to a source of electrical potential for a predetermined time interval and to isolate the remainder of the output terminals from that source when each such connection is made. The output terminal to which each solenoid winding is connected is chosen with reference to the operational sequence of the device 29 such that the sequence of energization of the solenoid windings is such that the solenoid windings of all the shut-off valves controlling the supply of liquid to the jets in one sluiceway, say the sluiceway 14A, are operated first followed in turn by operation of the solenoid windings of the shut-off valves controlling the supply of liquid to the jets of each of the other three sluiceways (say the sluiceway 14B followed by the sluiceway 14C followed by the sluiceway 14D); and so that the solenoid winding of the shut-off valve 28 that controls the supply of liquid to the jet 24 of each sluiceway 14A-14D that is furthest from the drag conveyor channel 15 is energized first, followed by the solenoid winding of the shut-off valve 27 for that sluiceway, followed then by the solenoid winding of the shut-off valve 26 for that sluiceway and finally the solenoid winding of the shut-off valve 25 for that sluiceway which is the shut-off valve that controls the supply of liquid to the jet 21 that is the one of the jets in that sluiceway that is nearest to the drag conveyor channel 15.

Each sluiceway 14A-14D comprises a trough formed in the floor of the machine tool workshop, that trough having vertical side walls 31 and a U-shaped base 32 which is arcuate at its apex. Each trough is lined with metal, the linings of the vertical side walls 31 being formed conveniently of mild steel whilst the lining for the base 32 is formed from an amoured steel such as "CORTEN" steel, the base lining being welded along its edges to the bottom of the mild steel side wall linings. The lining for the base 32 may be mild steel.

When the system is in operation, the main pump 12 draws clean liquid from within the drum of the drum filter apparatus 11 and feeds that liquid under pressure to the machine stations A of the machine tools B via the main header pipe 13. The secondary pump 17 taps some of the flow of clean liquid under pressure from the main header pipe 13 and feeds it under an increased pressure via the four header pipes 18A-18D and the branch pipes that project from those header pipes 18A-18D to the inlets of all the shut-off valves 25A-25D, 26A-26D, 27A-27D, and 28A-28D. Hence the secondary pump 17 maintains at the inlet of each shut-off valve 25A-25D, 26A-26D, 27A-27D, 28A-28D, a head of liquid pressure greater than the pressure of liquid flow through the main header pipe 13 to the various machine stations A of the machine tools B.

For convenience of the subsequent description of the operation of the system it will be assumed that the switching device 29 is adapted to energize the solenoid winding of the shut-off valves associated with the sluiceway 14A first, and to energize the solenoid winding of the shut-off valves associated with the sluiceways 14B, 14C and 14D in that order. Hence the solenoid winding of the shut-off valve 28A is energized first, all the other solenoid windings being de-energized whilst it is energized. Consequently, the shut-off valve 28A is opened and a jet of liquid emerges from the jet 24A for a predetermined time interval whilst all the other shut-off valves remain closed. At the end of that time interval, which is sufficient for the jet of liquid emerging from the flushing jet 24A to flush swarf received in the part of the sluiceway 14A between that jet 24A and the immediately downstream jet 23A towards and passed that jet 23A, the switching device 29 operates to de-energize the solenoid winding of the shut-off valve 28A and energize the solenoid winding of the shut-off valve 27A for the predetermined time interval. Hence swarf between the flushing jet 23A and the immediately downstream flushing jet 22A is flushed by the jet of liquid that emerges from the flushing jet 23A towards and passed that flushing jet 22A. The switching device 29 continues to operate after each predetermined time interval to de-energize the solenoid winding of one shut-off valve and to energize the solenoid winding of the shut-off valve that controls the supply of liquid to the next jet of the sequence. Hence swarf is flushed along each sluiceway 14A–14D in turn towards and into the drag conveyor channel 15 wherein it is picked up by the drag conveyor 16 and conveyed away from the settling tank 10 to the discharge station.

It will be realized that the sequence of operation of the flushing jets is repeated continuously during operation of the system.

The arrangement of the system whereby only one of the flushing jets functions at any given instant, and the pump that feeds liquid to the shut-off valves of the system draws that liquid from the header pipe by which liquid is fed to the machine stations of the machine tools, leads to minimization of the capacity of the pump that supplies liquid to flushing jets. Also the energy output of that pump is used in the most efficient manner since it is concentrated to flush swarf towards the drag conveyor channel because it is directed totally to form a flushing jet that is doing just that. Furthermore, the volume of liquid employed for flushing swarf along the sluiceways towards the drag conveyor channel is minimized.

In an exemplary installation which comprises four lines of machine tools, five flushing jets are provided at 10 meter intervals in the sluiceway for each line of machine tools. Each of the flushing jets has a 20 mm diameter orifice. The secondary pump selected delivers 100 cu.meters of liquid per hour at 150 p.s.i. The switching device is adapted to energize the solenoid windings of the shut-off valves in turn so that each flushing jet operates for five seconds to direct a jet of liquid to flush swarf along the respective sluiceway.

The sluiceway for each line of machine tools may slope downwards towards the settling tank 10, rather than towards the main drag conveyor channel, 15, so that liquid that drains into each sluiceway flows down it into the tank 10 directly.

I claim:

1. In a machine tool installation comprising lines of machine tools and a centralised swarf removal and coolant filtration and recirculation system, said system comprising a liquid storage tank, filtering means, primary pumping means for drawing liquid from the tank through the filtering means and for pumping at one pressure a stream of liquid so filtered to machine stations of the machine tools for use as a coolant in machining operations at said stations and means for collecting liquid drained from said stations and for returning such collected liquid to the tank; a swarf conveyance system comprising means forming a pathway along which swarf formed by machine tools of the system is to be conveyed and means for impelling swarf along said pathway; said swarf impelling means comprising a series of jets which are located at spaced intervals along the pathway and which are orientated so that they are adapted to direct jets of liquid under pressure at swarf on said pathway, secondary pumping means for tapping liquid from the stream of liquid pumped to said machine stations by said primary pumping means and for pumping such tapped liquid toward each jet of the series under a pressure which is higher than said one pressure, and control means adapted to effect operation of the jets of the series one at a time in a programmed sequence so that each in turn directs at swarf on the pathway a jet of the liquid that is pumped towards it by said secondary pumping means whereby that swarf is impelled along the pathway by the impulse forces imparted to it sequentially by the series of jets of liquid under pressure that are directed at it sequentially.

2. A swarf conveyance system according to claim 1, wherein said pathway is one of a plurality of such pathways each having such a series of jets which are located at spaced intervals along the pathway and which are orientated so that they are adapted to direct jets of liquid under pressure at swarf on the respective pathway, said secondary pumping means being adapted to pump such tapped liquid towards each jet of each series, and said control means being adapted to effect operation of the jets of all the series one at a time in a programmed sequence so that each in turn directs at swarf on the respective pathway a jet of the liquid that is pumped towards it by said secondary pumping means.

3. A swarf conveyance system according to claim 1, wherein conduit means are provided by which each jet of the swarf conveyance system is connected to the output of the secondary pumping means in parallel to the connection of all the jets of that system to that output.

4. A swarf conveyance system according to claim 3, wherein each parallel branch of the conduit means includes a normally-closed shut-off valve which prevents liquid flow to the respective jet when closed, the control means being adapted to cause opening of each shut-off valve in turn in order to effect operation of the respective jets in said programmed sequence.

5. A swarf conveyance system according to claim 1, claim 2, claim 3 or claim 4, wherein said secondary pumping means are adapted to be driven continuously during operation of the centralised swarf removal and coolant filtration and recirculation system.

6. A swarf conveyance system according to claim 1 wherein said means which the pathway comprise a metal lined sluiceway.

7. A swarf conveyance system according to claim 6, wherein the lining along the base of the sluiceway is formed of an armoured steel.

* * * * *